US006826148B1

(12) United States Patent
Lee

(10) Patent No.: US 6,826,148 B1
(45) Date of Patent: *Nov. 30, 2004

(54) SYSTEM AND METHOD FOR IMPLEMENTING A ROUTING SCHEME IN A COMPUTER NETWORK USING INTENTION PACKETS WHEN FAULT CONDITIONS ARE DETECTED

(75) Inventor: Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 09/624,850

(22) Filed: Jul. 25, 2000

(51) Int. Cl.$^7$ ............................................... H04L 12/56
(52) U.S. Cl. ..................................... 370/230; 370/235
(58) Field of Search ................................. 370/230, 235, 370/235.1, 237, 389, 242; 714/48, 748

(56) References Cited

U.S. PATENT DOCUMENTS

| | | | |
|---|---|---|---|
| 5,689,646 A | | 11/1997 | Thorson |
| 5,689,661 A | | 11/1997 | Hayashi et al. |
| 5,701,416 A | | 12/1997 | Thorson et al. |
| 5,720,025 A | | 2/1998 | Wilkes et al. |
| 5,737,628 A | | 4/1998 | Birrittella et al. |
| 5,970,232 A | | 10/1999 | Passint et al. |
| 6,016,510 A | | 1/2000 | Quattromani et al. |
| 6,023,753 A | | 2/2000 | Pechanek et al. |
| 6,055,618 A | | 4/2000 | Thorson |
| 6,101,181 A | | 8/2000 | Passint et al. |
| 6,167,502 A | | 12/2000 | Pechanek et al. |
| 6,330,435 B1 | * | 12/2001 | Lazaraq et al. ............. 455/412 |
| 6,567,378 B1 | * | 5/2003 | Yuan et al. .................. 370/235 |

FOREIGN PATENT DOCUMENTS

| | | |
|---|---|---|
| EP | 0 785 512 | 7/1997 |
| WO | 99/26429 | 5/1999 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

(List continued on next page.)

Primary Examiner—Kenneth Vanderpuye
(74) Attorney, Agent, or Firm—Robert C. Kowert; Meyertons, Hood, Kivlin, Kowert & Goetzel, P.C.

(57) ABSTRACT

An apparatus and method for implementing a transmission scheme employing intention is contemplated. At times, a switching device within a network may detect a fault, corruption, or congestion. When a switching device detects a fault, corruption, or congestion, it may drop one or more packets to resolve the fault, corruption or congestion. When a packet is dropped, the switching device that dropped it may create an intention, packet that corresponds to the dropped packet. The switching device may then route the intention packet to the destination device specified by the dropped packet. The intention packet may be routed along a different route than the original route specified by the dropped packet. The intention packet may be much smaller than the dropped packet and may include parts of a portion of the dropped packet. The intention packet may also record the route it takes to get to the destination device. A device may react to receiving an intention packet based on the information in the intention packet as well as its own characteristics.

47 Claims, 8 Drawing Sheets

OTHER PUBLICATIONS

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product–info/mpp/T3D__Architecture__Over/T3D.overview.html, Cray Research, 1993, 40 pages.

Marco Fillo, et al., "The M–Machine Multicomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the 20$^{th}$ International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Daily, "High–Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High–Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufman Publishers, 1992, pp. 1–831.

Christopher J. Glass and Lionel Ni, "Fault–Tolerant Wormhole Routing in Meshes," Technical Report, MSU–CP–S–ACS–72, Oct. 30, 1992 (revised May 25, 1993), 28 pages.

Stefan Savage and John Wilkes, "AFRAID–A Frequently Redundant Array of Independent Disks," Proceedings of the 1996 USENIX Technical Conference, pp. 27–39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU–CP–S–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Restrospective," in 25 Years of the International Symposia on Computer Architecture—Selected Papers, pp. 54–58.

* cited by examiner

SYSTEM AND METHOD FOR IMPLEMENTING A ROUTING SCHEME IN A COMPUTER NETWORK USING INTENTION PACKETS WHEN FAULT CONDITIONS ARE DETECTED

CROSS-REFERENCE TO RELATED APPLICATION

This application relates to co-pending U.S. patent application, Ser. No. 09/625,381, filed on the same day as the present application and entitled "System and Method for Implementing a Routing Scheme Using Intention Packets in a Computer Network" by Whay S. Lee, which is incorporated herein by reference in its entirety, and to co-pending U.S. patent application, Ser. No. 09/624,856, filed on the same day as the present application and entitled "Routing Mechanism Using Intention Packets in a Hierarchy of Networks" by Whay S. Lee, which is incorporated herein by reference in its entirety.

BACKGROUND OF THE INVENTION

1. Field of the Invention

This invention relates generally to the field of computer systems and, more particularly to communications protocols within computer systems and/or networks, and communication routing or switching within computer systems and/or networks.

2. Description of the Related Art

Devices in a communications network may communicate with one another by sending packets to each other. These packets may correspond to an operation that one device seeks to perform with the assistance of another device. Packets may be transferred between devices using a network which may include a fabric. A network generally may comprise a number of devices that are configured to convey packets between any number of devices.

At times, however, adverse transmission conditions may occur in the network when one device is sending a packet to another device on the network. For example, the network may become overly congested with packets traveling between devices. Another adverse condition that may occur in networks is corruption of a packet (e.g. an ECC error, parity error, checksum error, etc.). A fault condition (e.g. failure in the fabric) that prevents a packet from proceeding along its proposed route is another adverse condition. One adverse condition resolution scheme in packet routing protocols involves dropping packets in response to an adverse transmission condition within one or more devices (e.g. a switch, switching device, endpoint, node, etc.) in the network. In the case of congestion, a device within the network may drop one or more packets randomly or selectively to instantaneously reduce the packet load. By dropping one or more packets, the device can free up sufficient resources to service the remaining packets. Corrupted packets may also be dropped. For a fault condition, all packets reaching a fault point may have to be dropped and resent using a different route.

When a packet is dropped, the device that originated the packet needs to detect that it has been dropped so that it can be resent. Detection of dropped packets may be accomplished by a time-out mechanism at at receiving device when it fails to receive an expected packet, by a time-out mechanism at a sending device where the sending device is waiting for a signal from a receiving device that a packet has been received, or by sending a negative acknowledgement (NACK) from the device that dropped the packet to the sending device.

Each of these detection methods has its problems, however. Where a time-out mechanism is used, a device needs to ensure that it does not resend a packet until it is certain that the original packet has been dropped. The device must generally wait a period of time to ensure that the packet has been dropped and this waiting period results in a performance penalty. Where a NACK to the sending device is used to signal a dropped packet, a dropped packet is unknown to the receiving device, no matter how far through the network the dropped packet traveled before being dropped. The NACK propagates back only to the sender and the network resources consumed by the dropped packet are wasted. An apparatus and method of handling adverse transmission conditions that minimizes the drawbacks of the above methods is needed.

SUMMARY

The problems outlined above are in large part solved by the use of the apparatus and method described herein. Generally speaking, an apparatus and method is contemplated for implementing a routing scheme using intention packets. At times, a switching device within a network may detect a fault, corruption, or congestion. When a switching device detects a fault, corruption, or congestion, it may drop one or more packets to resolve the fault, corruption or congestion. When a packet is dropped, the switching device that dropped it may create an intention packet that corresponds to the dropped packet. The switching device may then route the intention packet to the destination device specified by the dropped packet. The intention packet may be routed along a different route than the original route specified by the dropped packet. The intention packet may be much smaller than the dropped packet and may include parts of a portion of the dropped packet. The intention packet may also record the route it takes to get to the destination device.

A device may react to receiving an intention packet based on the information in the intention packet as well as its own characteristics. The information in the intention packet may indicate whether the dropped or modified packet was a request or a response to a request. If the dropped or modified packet was a request, then the device that receives the intention packet, i.e. the receiving device, may send a signal to the requesting device that its request has been dropped. The receiving device may also perform an operation that corresponds to the request in anticipation of receiving the resent packet. If the dropped or modified packet was a response to a request, then the requesting device may receive the intention packet. The requesting device may reschedule the request in response to receiving the intention packet and may convey a subsequent packet that includes the request to the receiving device. The requesting device may be configured optimize the resending of the request by rescheduling the request for a more appropriate time or by merging the request with a subsequent request.

A device in a network may detect a fault. A fault may be a condition that prevents a packet from continuing along its intended or proposed route. For exanple, a fault may condition may result from failure of a downstream switching device. If a device detects a fault, the operation corresponding to the packet may be aborted, and the device may generate an intention packet and convey the intention packet to the destination device along an alternate route. The device may also drop all or a portion of the packet. The destination device may forward the intention packet to the initiating device. The initiating device may use the route record of the intention packet to reconfigure its routing algorithm before resending the original packet.

A device may also detect a fault at a destination device. In this case, the operation corresponding to the packet may be aborted, and the device may generate an intention packet and convey that packet to the initiating device to indicate a destination failure. The device may also drop all or a portion of the original packet. The initiating device may resend the original packet or may send a packet to an alternative destination in response to an intention packet that indicates a destination failure.

Instead of or in addition to a fault condition, a device may detect other adverse transmission conditions such as corruption and congestion. For example, at times, one or more devices in a network may become congested. When a device becomes congested, it may drop one or more packets to alleviate some of the congestion. The devices may each include one or more ports and they may support a particular amount of resources (such as bandwidth, buffers, etc.) in and out of each of their ports. When a packet or a portion of a packet arrives at a device, the device may determine what port the packet will need and the amount of resources required by the packet on that port. If the required resources are available for the packet on the port, then the switching device may route the packet to a next device. If the required resources are not available for the packet on the port, then the device may drop at least a portion of the packet. When a packet is dropped, the device that dropped it may create an intention packet that corresponds to the dropped packet. The switching device may then route the intention packet to the destination device specified by the dropped packet. In one embodiment, a device may consider the age of a packet as well as the amount of resources already consumed by the packet in determining which packet to drop.

A device in a network may detect corruption of a packet (e.g. ECC error, parity error, checksum error). When a device detects corruption, the operation corresponding to the packet may be aborted and the device may generate an intention packet and convey the intention packet to the destination device. The device may record the type of error detected in the intention packet. The intention packet may be conveyed along the original route or along an alternate route. The switching device may also drop all or a portion of the packet. The destination device may forward the intention packet to the initiating device. The initiating device may respond according to the type of error that was recorded in the intention packet.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF AN EMBODIMENT

Figure 1:
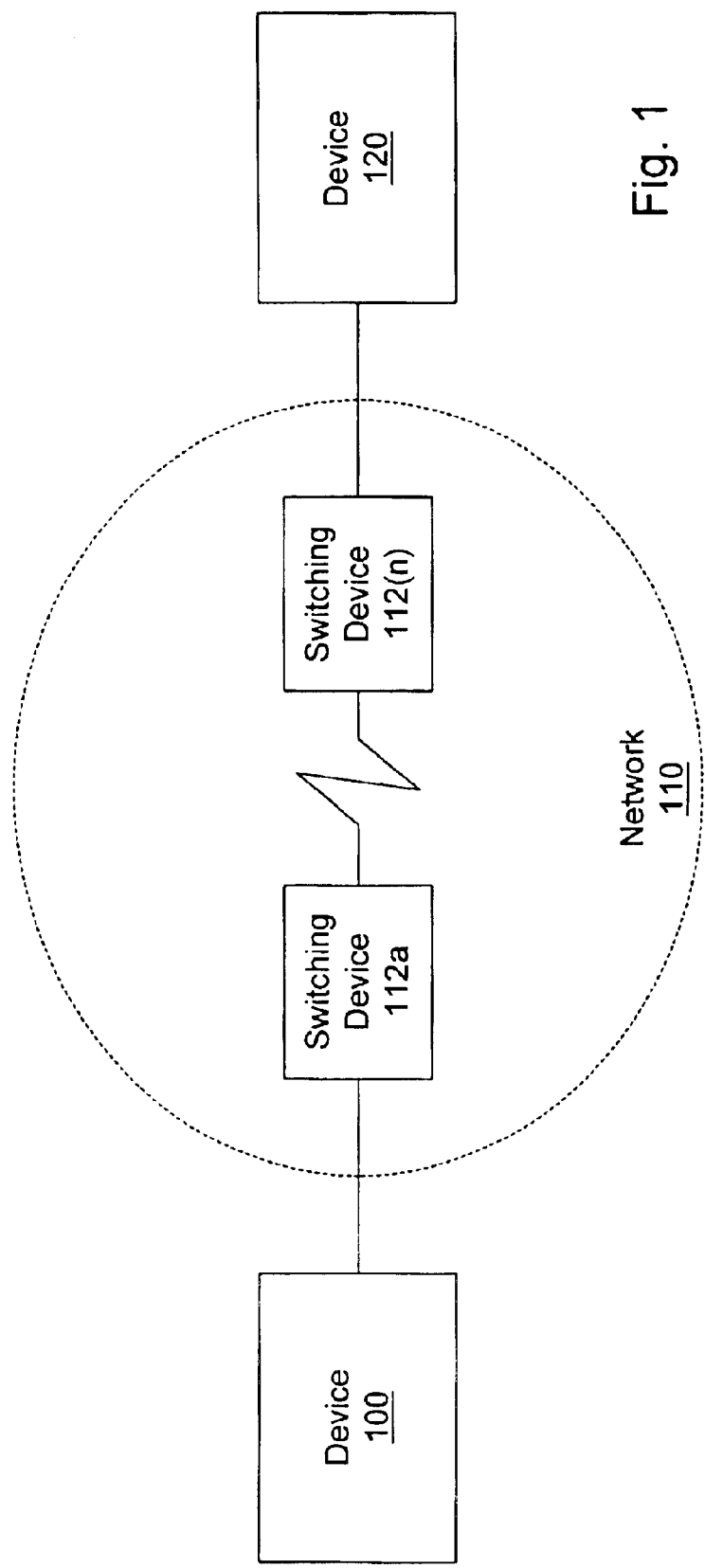
FIG. 1 is a block diagram illustrating one embodiment of devices connected through a network.

Turning now to FIG. 1, a block diagram illustrating one embodiment of devices connected through a network. FIG. 1 depicts device 100 coupled to device 120 through network 110. Network 110 includes switching devices 112a through 112(n). It can be noted that any number, n, of switching devices may be included in network 110 and that the switching devices may be connected in any manner. It can be noted that device 100 and device 120 can comprise any type of devices configured to communicate with other devices. In one particular embodiment, device 100 may comprise a computer system host interface to a storage system and device 120 may comprise a disk drive. Alternatively, devices 100 and 120 may be any combination of networked devices, such as client computers, servers, storage devices, etc. Network 110 may be a network on any scale, such as from the Internet, to a LAN or a network inside a single system interconnecting multiple disk drives or other I/O devices. In an Internet embodiment, device 100 may be a requestor of a web page and device 120 may be a web server.

Devices 100 and 120 may be configured to communicate through network 110. Device 100 may convey a request to switching device 112a. The request may be routed or transmitted through network 110 until it is received at switching device 112(n) and ultimately at device 120. Device 120, depending on the request, may convey a response to the request to switching device 112(n). The response may be routed through network 110 until it is received at switching device 112a and ultimately at device 120. In one embodiment, switching devices 112 are simple switches that include at least one input port, one output port, and operate to pass data from an input port to an output port. In other embodiments, switching devices 112 may be more intelligent devices such as packet routers or computer systems.

Generally speaking, a request may be a signal from a first device to a second device for the second device to perform an operation or operations. For example, a request may signal a device to read data from or write data to a particular location. A response may be a signal from the second device to the first device that corresponds to the request. A response, for example, may indicate whether or not the operation signaled by the request was performed successfully or may convey data corresponding to the request. In one embodiment, requests and responses may be conveyed using packets defined by a communications protocol. Devices 100 and 120 may be configured to convert their respective requests and responses into packets prior to conveying the packets to network 110.

The switching devices in network 110 may implement a transmission scheme using intention packets. In routing a packet through network 10 from its sending device to its destination device, a switching device may detect a fault, corruption, or congestion involving one or more switching devices in network 110. A fault may be defined as an error or failure in network 110 that prevents a packet from proceeding along its proposed route. Corruption may include error correction control (ECC), parity errors, or checksum errors. Congestion may occur when a switching device does not have enough bandwidth or resources to handle one or more packets. The switching devices may be configured to respond to a fault, corruption, or congestion condition by dropping all or a portion of the packet and generating an intention packet. The switching devices may then convey the intention packet to the destination device. The intention packet may be routed along a different route than the route specified by the dropped packet. The intention packet may be much smaller than the dropped packet and may include parts of a tail portion of the dropped packet as discussed in a specific embodiment below. The intention packet may record the route it takes to get to the destination device. The destination device may convey the intention packet to the sending device.

Figure 2A:
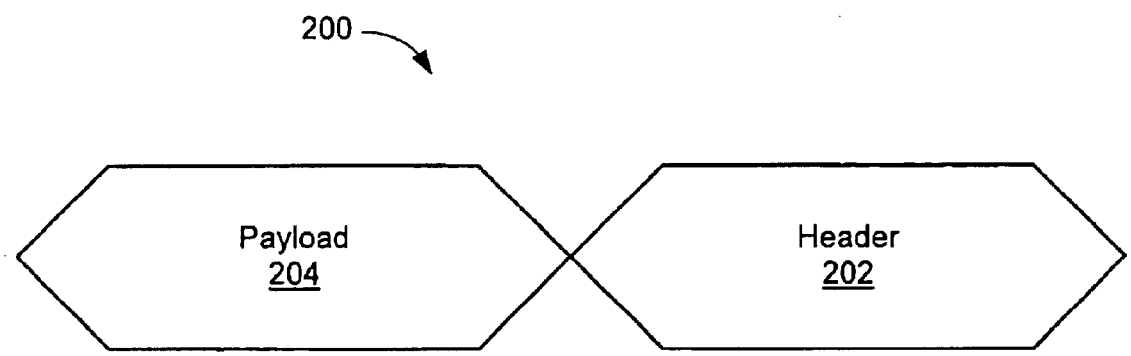
FIGS. 2a–2e illustrate variuos embodiments of packets.

FIG. 2a illustrates one embodiment of a packet 200 that may be used in the embodiment of FIG. 1. Packet 200 may include a header 202 and a payload 204. Header 202 may include sequencing and network routing information, indicators of the source and destination devices, an address corresponding to a beginning data block, and an indicator of the number of data blocks involved in the request that corresponds to the packet. Payload 204 may include one or more data blocks being transferred by packet 200. The number of data blocks in payload 204 may be variable or fixed according to a given communications protocol. It can be noted that payload 204 may be empty (or absent) for certain types of packets. Header 202 and/or payload 204 may include other information as required by a protocol.

Figure 2B:
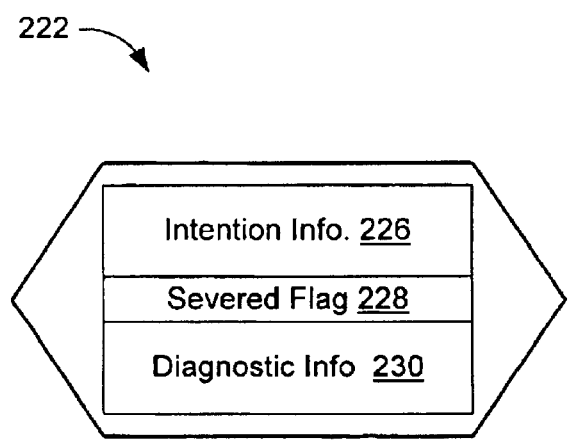

FIG. 2b illustrates one embodiment of an intention packet 222. Intention packet 222 may include intention information 226, severed flag 228 and diagnostic information 230. In one embodiment, intention information 226 may include the information of header 202 of the dropped packet. In other embodiments, intention information 226 may include only selected or modified portions of header 202 of the dropped packet. Severed flag 228 may include an indicator that the intention packet corresponds to a dropped packet. Diagnostic information 230 may include a switch indicator which may identify the switching device where the original packet was dropped. Diagnostic information 230 may include congestion statistics which may include congestion information of the switching device where the original packet was dropped. The intention packet may be generated by the device using software, hardware or a combination thereof.

Once a switching device generates intention packet 222, the switching device may convey intention packet 222 to the destination device through network 110. Since intention packet 222 may comprise a small packet, it may be assured (or nearly assured) of routing through the subsequent switching devices in network 110 to reach its destination device if congestion was the adverse condition. The switching devices may be configured to insure that they always have the required bandwidth or resources to route packets up to a maximum size. The intention packets may be below this maximum size such that the switching devices may always route them.

A device may react to receiving an intention packet based on the information in the intention packet as well as its own characteristics. The information in the intention packet may indicate whether the dropped packet was a request or a response to a request. If the dropped packet was a request, then the device that receives the intention packet, i.e. the receiving device, may send a signal to the requesting device that its request has been dropped. This signal may be a NACK packet conveyed from the receiving device so that the requesting device may resend the dropped packet. The receiving device may also perform an operation that corresponds to the request in anticipation of receiving the resent packet as discussed below in more detail.

If the dropped packet was a response to a request, then the requesting device will receive the intention packet. The requesting device may reschedule the request in response to receiving the intention packet and may convey a subsequent packet that includes the request to the receiving device. The requesting device may be configured to optimize the resending of the request by rescheduling the request for a more appropriate time or by merging the request with a subsequent request.

One embodiment of the routing scheme may include two types of normal packets - move packets and write packets. The move and write packets may correspond to read, move, or write operations requested by devices. For example, a write operation may be performed by conveying a write packet from a first device to a second device. The second device may respond by conveying an acknowledgement (ACK) to the first device. In addition, a read operation may be performed by sending a move packet from a first device to a second device. The second device may respond by sending a write packet to the first device to complete the read operation. The first device may also convey an ACK to the second device once the read operation has been completed. Similarly, a move operation may be performed by sending a move packet from a first device to a second device. The second device may respond by sending a write packet to a third device and the third device may convey an ACK to the first device.

Figure 2C:
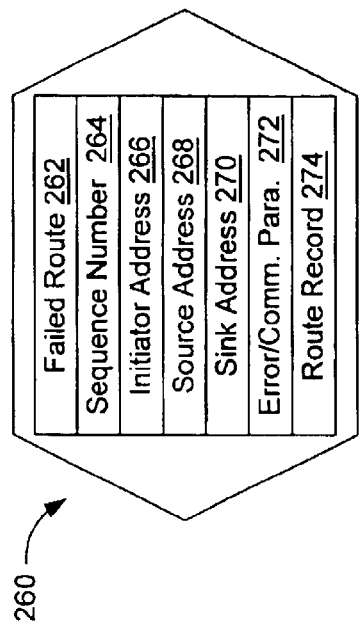

FIG. 2c illustrates one embodiment of a move packet 201. Move packet 201 may include proposed route 203, sequence number 205, initiator address 206, source address 208, sink address 210, move parameters 212, and route record 214. Proposed route 203 may indicate the route for the move packet 201 to take from its source device to its destination device. Sequence number 205 may include a sequence number to prevent out-of-order accesses to the same data block at a destination device. Initiator address 206 may indicate the device that initiated the packet. Source address 208 may indicate the device that includes one or more data blocks to be operated on. Sink address 210 may indicate the device where the one or more data blocks indicated by source address 208 are to be moved. Move parameters 212 may indicate the type of operation to be performed, the size of the data to be operated on, the location of the data, proposed route to be taken by the write packet generated by move packet 201, and/or other information. Route record 214 may indicate the actual route taken by move packet 201, e.g. it may indicate the switching devices 112 that routed it in network 110 of FIG. 1. It can be noted that each switching device that receives move packet 201 may supplement the information in route record 214.

Generally speaking, move packet 201 may be used to cause one or more data blocks to be moved from a source device to a sink device. Where the device that initiates a move packet 201 is also the sink device, the move packet 201 may be considered to be a read packet. Move packet 201 may be atomic, e.g. a switching device may operate on the packet as a whole. Move packet 201 may also be error correction control (ECC)protected, e.g. a switching device may be configured to determine if the packet has been corrupted.

Figure 2E:
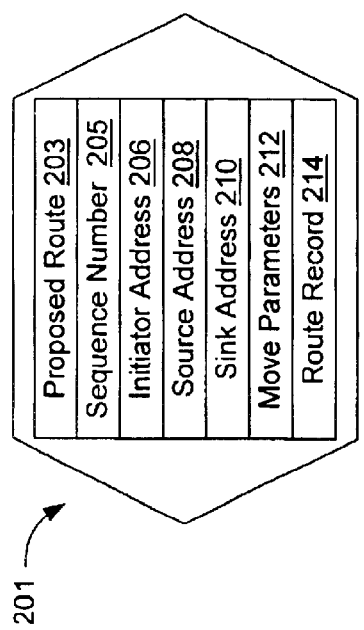
Figure 2D:
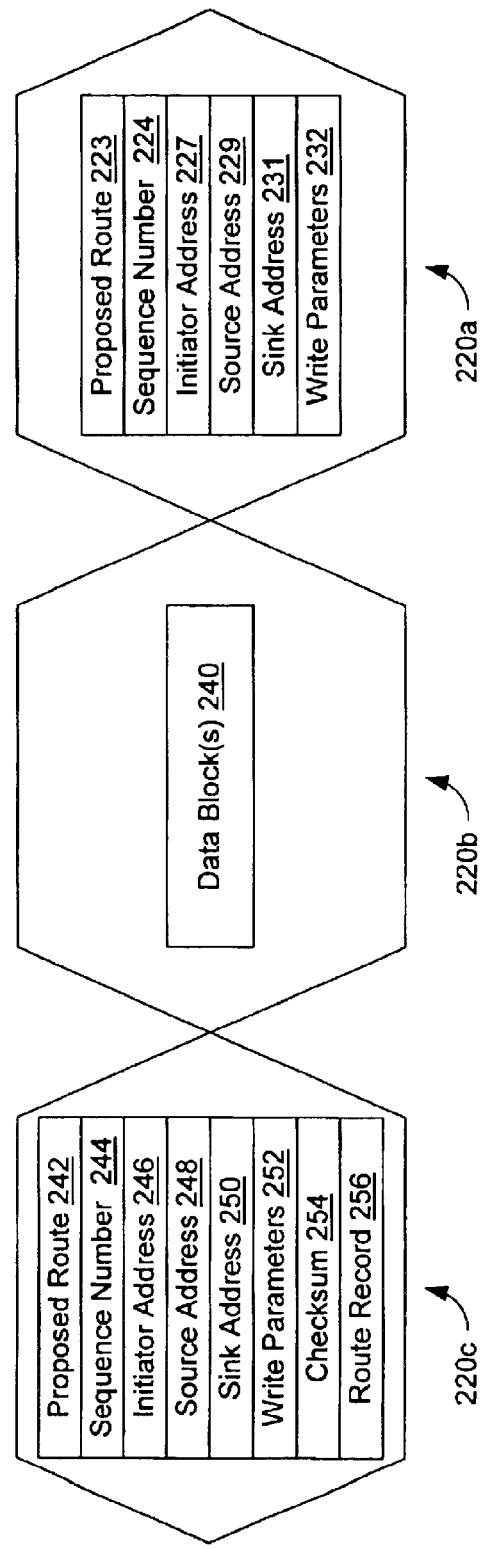

FIG. 2d illustrates one embodiment of a write packet 220. Write packet 220 may include header 220a, payload 220b, and tail 220c. Header 220a may include proposed route 223, sequence number 224, initiator address 227, source address 229, sink address 231, and write parameters 232. Proposed route 223 may indicate the route for the write packet 220 to take from its source device to its destination device. Sequence number 224 may include a sequence number to prevent out-of-order accesses to the same data block at a destination device. Initiator address 227 may indicate the device that initiated the packet. Source address 229 may indicate the device that includes one or more data blocks to be operated on. Sink address 231 may indicate the device where the one or more data blocks indicated by source address 229 are to be written. Write parameters 232 may indicate the type of operation to be performed, the size of the data to be operated on, the location of the data, and/or other information. Payload 220b may include one or more data blocks 240, e.g. 1 Kbyte blocks, that are to be written at the sink device. Tail 220c may include proposed route 242, sequence number 244, initiator address 246, source address 248, sink address 250, write parameters 252, checksum 252, and route record 256. Proposed route 242, sequence number 244, initiator address 246, source address 248, sink address 250, and write parameters 252 may be copies of the information found in header 220a. Checksum 252 may include a checksum value that corresponds to the one or more data blocks 240. Route record 256 may indicate the actual route taken by write packet 220, e.g. it may indicate the switching devices 112 that routed it in network 110 of FIG. 1. It can be noted that each switching device that receives write packet 220 may supplement the information in route record 256.

Generally speaking, write packet 220 may be used to cause one or more data blocks to be written at a sink device. Header 220a and tail 220c may each be atomic, e.g. a switching device may operate on them independently from the remainder of write packet 220, and ECC-protected.

When a move packet 201 or a write packet 220 is being routed through network 110, a switching device may detect a fault, corruption, or congestion with respect to the move packet 200 or the write packet 220. If a fault, corruption or congestion is detected, a switching device may generate an intention packet. In addition, a switching device may drop or modify the move packet or the write packet. In one particular embodiment, a switching device may generate an intention packet that corresponds to a move packet 201 by modifying information in the move packet 201. In this embodiment, a switching device may generate an intention packet that corresponds to a write packet 220 by dropping all or a portion payload 220b of a write packet 220 and using information from the header 220a or the tail 220c to generate the intention packet.

Once a switching device generates an intention packet, the switching device may convey the intention packet to the destination device through network 110. Since the intention packet comprises a small, atomic packet, it will most likely route through the subsequent switching devices in network 110 to reach its destination device. The switching devices may be configured to insure that they always have the required resources to route packets up to a maximum size. The intention packets may be below this maximum size such that the switching devices may always route them. Note that in some cases, an adverse condition or combination of adverse conditions may be severe enough so that the intention packet cannot be routed or transmitted to its destination or cannot be routed or transmitted to its destination in a reasonable time. Such cases may be handled for the intention packet by conventional mechanisms, such as a time-out mechanism.

FIG. 2e illustrates one embodiment of an intention packet 260. In certain embodiments, intention packet 260 may correspond to either a move packet 201 or a write packet 220. In other embodiments, an intention packet for a move packet may differ from an intention packet for a write packet. Intention packet 260 may include failed route 262, sequence number 264, initiator address 266, source address 268, sink address 270, error/command parameters 272, and route record 274. Failed route 262 may indicate the route for the packet was scheduled to take from its source device to its destination device. Sequence number 264 may include a sequence number to prevent out-of-order accesses to the same data block at a destination device. Initiator address 266 may indicate the device that initiated the packet. Source address 268 may indicate the device that includes one or more data blocks to be operated on. Sink address 270 may indicate the device where the one or more data blocks indicated by source address 268 are to be moved or written. Error/command parameters 272 may indicate the type of error detected, the type of operation to be performed, the size of the data in the move or write, the location of the data, and/or other information. Route record 274 may indicate the actual route taken by the packet, e.g. it may indicate the switching devices 112 that routed it in network 110 of FIG. 1. It can be noted that each switching device that receives intention packet 260 may supplement the information in route record 274. Intention packet 260 may be atomic and ECC-protected.

In one specific embodiment, if the intention packet corresponds to a move packet 201, then a switching device may generate an intention packet by copying proposed route 203, sequence number 205, initiator address 206, source address 208, sink address 210, move parameters 212, and route record 214 into failed route 262, sequence number 264, initiator address 266, source address 268, sink address 270, error/command parameters 272, and route record 274, respectively. The switching device may add information to error/command parameters 272 to indicate the type of error, i.e. fault, corruption, or congestion, and may update route record 274. If the intention packet corresponds to a write packet 220, then a switching device may generate an intention packet by copying proposed route 242, sequence number 244, initiator address 246, source address 248, sink address 250, write parameters 252, and route record 256 into failed route 262, sequence number 264, initiator address 266, source address 268, sink address 270, error/command parameters 272, and route record 274, respectively. The switching device may add information to error/command parameters 272 to indicate the type of error, e.g. fault, corruption, or congestion, and may update route record 274. The switching device may drop payload 220b, header 220a, and checksum 254. In other embodiments, intention packet 260 may include other types of information, may omit certain information illustrated in FIG. 2e, or may include information from other portions of a move or write packet. In addition, a switching device may drop other portions of a move or write packet.

As mentioned above, a switching device may generate an intention packet in response to detecting a fault, corruption or congestion in network 110. The switching device may perform other functions depending on the type of packet and the type of error detected. Certain types of faults, corruption, and congestion cases will now be discussed.

In certain instances, a switching device in network 110 may detect a fault. A fault may be defined as an error or failure in network 110 that prevents a packet from proceeding along its proposed route. The switching device may detect a fault at a downstream switching device, i.e. at a switching device that is to receive the move or write packet. If a switching device detects this type of fault, the operation corresponding to the packet may be aborted, and the switching device may generate an intention packet and convey the intention packet to the destination device along an alternate route. The switching device may also drop all or a portion of the packet. The destination device may forward the intention packet to the initiating device. The initiating device may use the route record of the intention packet to reconfigure its routing algorithm before resending the original packet. The initiating and destination devices may perform other operations in response to the intention packet as discussed below.

A switching device may also detect a fault while routing a portion of a write packet. For example, the switching device may detect a fault while routing the payload of a packet. In this case, the operation corresponding to the packet may be aborted, and the switching device may generate an intention packet and convey the intention packet to the destination device along an alternate route. The switching device may also drop the remaining payload portion of the write packet. The destination device may drop any portion of the write packet, such as the header or payload, that it receives prior to the intention packet and forward the intention packet to the initiating device. The initiating device may use the route record of the intention packet to reconfigure its routing algorithm before resending the original packet. The initiating and destination devices may perform other operations in response to the intention packet as discussed below.

A switching device may also detect a fault at a destination device. In this case, the operation corresponding to the packet may be aborted, and the switching device may generate an intention packet and convey that packet to the initiating device to indicate a destination failure. The switching device may also drop all or a portion of the original packet. The initiating device may resend the original packet or may send a packet to an to alternative destination in response to an intention packet that indicates a destination failure.

A switching device in network 110 may also detect corruption of a packet in certain instances. For example, a switching device may detect an ECC error in front of, i.e. at a downstream switching device, a write or a move packet. In this case, the operation corresponding to the packet may be aborted and the switching device may generate an intention packet and convey the intention packet to the destination device. The switching device may record the type of error detected in the intention packet. The intention packet may be conveyed along the original route or along an alternate route if necessary. The switching device may also drop all or a portion of the packet. The destination device may forward the intention packet to the initiating device. The initiating device may respond according to the type of error that was recorded in the intention packet. The initiating and destination devices may perform other operations in response to the intention packet as discussed below.

A switching device may also detect a parity, ECC, or checksum error in the payload or tail of a write packet. In this case, the operation corresponding to the write packet may be aborted, and the switching device may generate an intention packet and convey the intention packet to the destination device. The switching device may record the type of error detected in the intention packet. The intention packet may be conveyed along an alternate route. The switching device may also drop the remaining portion of the payload of the write packet. The intention packet may indicate to the destination device that any portion of the payload received was corrupted and should be discarded. Alternatively, the destination device may perform its own checksum check and discard any corrupted portion of the packet that was not dropped by the switching device. The destination device may forward the intention packet to the initiating device. The initiating device may respond according to the type of error that was recorded in the intention packet. The initiating and destination devices may perform other operations in response to the intention packet as discussed below.

At times, one or more switching devices within network 110 may become congested. When a switching device becomes congested, it may drop one or more packets to alleviate some of the congestion. Switching devices 112*a* through 112(*n*) may each include one or more ports. The switching devices may support a particular amount of resources in and out of each of their ports. When a packet or a portion of a packet arrives at a switching device, the switching device can determine what port the packet will need and the amount of resources required by the packet on that port. If the required resources are available for the packet on the port, e.g. the required resources are less than or equal to the available resources, then the switching device may route the packet to a next device. If the required resources are not available for the packet on the port, then the switching device may drop at least a portion of the packet.

A switching device may be configured to remember the amount of resources that it has committed to other traffic, e.g. other packets, and may drop a subsequent packet when it is unable to guarantee the resources requested by the subsequent packet. When a packet is dropped, the switching device that dropped it may create an intention packet that corresponds to the dropped packet. The switching device may then route the intention packet to the destination device specified by the dropped packet. The intention packet may be much smaller than the dropped packet and may include a tail portion of the dropped packet. Accordingly, it may require substantially less resources than the dropped packet so that a switching device may be able to guarantee its delivery to the next device along the route specified by the dropped packet. If a switching device is unable to convey the intention packet to the next device along the route specified by the dropped packet, it may convey it along an alternate route. The alternate route may be recorded in the intention packet by each switching device along the route.

A switching device may consider the age of a packet as well as the amount of resources already consumed by the packet in determining which packet to drop. The switching device may give priority to those packets that have routed a long way or that have waited a long time. If a packet at its source device fails to be injected into network 110 for too long of a time, then the source device may drop the packet and convey an intention packet in its place to free up resources.

In one embodiment, a write packet 220 is dropped only when it is in conflict with another write packet 220. If the write packet 220 is in conflict with a move packet 201 or an intention packet 260, then the write packet 220 may be temporarily blocked and conveyed subsequent to the move packet 201 or the intention packet 260.

In one embodiment, network 110 may implement a hop-by-hop positive acknowledgement scheme where all or a portion of a packet is saved at a switching device until that switching device confirms that the packet has safely arrived at the next two switching devices along the route. The switching devices may require an acknowledgement from the next two switching devices before dropping the saved portion of the packet. If a switching device fails to receive an acknowledgement from the next two switching devices, the saved packet or portion of a packet may be converted into an intention packet and may be adaptively routed along a different route in network 110. In one particular embodiment, a switching device may save move packets intact and may save the tail portion of write packets.

In one embodiment, network 110 may implement a resource-reserving wormhole routing model. In this model, header 220a of a write packet 220 may travel ahead of its corresponding, payload 220b in network 110. As header 220a routes from switching device to switching device in network 10, it may reserve resources (e.g. bandwidth) for its payload 220b at each subsequent switching device. Once the resources are reserved in a switching device, the switching device may assure that payload 220b will route successfully to the next switching device. If a switching device along the way cannot provide the required resources for payload 220b, then that switching device may be configured to drop payload 220b and generate an intention packet as discussed above. In this embodiment, the switching device may generate the intention packet using tail 220c.

In one embodiment, packets may be source-routed obliviously, e.g. using an e-cube routing algorithm. In the absence of faults, corruption, or congestion, a packet may be routed in a tightly pipelined fashion between the switching devices in network 10. If a switching device receives a portion, i, of a given packet at time t, then the switching device can expect to receive a next portion, i+1, at a time t+1. If the switching device does not receive the next portion i+1 at time t+1, then the switching device may detect a fault or corruption condition and drop all or a portion of the packet.

A device may react to receiving an intention packet based on the information in the intention packet as well as its own characteristics. The information in the intention packet may indicate whether the dropped or modified packet was a request or a response to a request. If the dropped or modified packet was a request, then the device that receives the intention packet, i.e. the receiving device, may send a signal to the requesting device that its request has been dropped. The receiving device may also perform an operation that corresponds to the request in anticipation of receiving the resent packet. If the dropped or modified packet was a response to a request, then the requesting device can receive the intention packet. The requesting device may reschedule the request in response to receiving the intention packet and may convey a subsequent packet that includes the request to the receiving device. The requesting device may be configured optimize the resending of the request by rescheduling the request for a more appropriate time or by merging the request with a subsequent request.

In one particular embodiment of FIG. 1, device 100 may comprise a host interface device that is coupled to a computer network (not shown) and device 120 can comprise a disk drive. In this embodiment, the host interface device can perform read and write accesses to the disk drive on behalf of devices in the computer network. The cases of a write request and a read request with the host interface and disk drive will now be discussed to illustrate the use of intention packets in a congested network.

In order to perform a write request, the host interface may convey a write packet 220 to the disk drive through network 110. If none of the switching devices that receive write packet 220 detects a fault, corruption, or congestion, then the packet may be routed to the disk drive where the disk drive may perform a write operation corresponding to the write request. Depending on the communications protocol employed by the system, the disk drive may convey a packet back to the host interface to indicate that the write request was successful after completing the write operation.

If a switching device that receives write packet 220 detects a fault, corruption, or congestion, then that switching device may generate an intention packet and may drop a portion of the write packet. The switching device can then convey the intention packet to the disk drive though network 110. As noted above, the intention packet may be assured of routing successfully to the disk drive by virtue of its relatively small size.

When the intention packet is received at the disk drive, the disk drive may convey the intention packet to the host interface to indicate that the write packet corresponding to the write request has been dropped. The disk drive may record the information regarding the write request such as the location and the size of the write in a list of outstanding requests, i.e. requests whose packets were dropped in network 110 where the resent requests have not been received by the disk drive. The disk drive may also perform one or more operations corresponding to write request, such as reading old blocks for a parity computation or flushing a write buffer, in anticipation of receiving a resent request from the host interface.

When the disk drive receives another request that is not the resent request, the disk drive can compare this request to the list of outstanding requests. If the request is !μl independent of each of the outstanding requests, i.e. attempts to write a different region of data than each of the severed requests, then the disk drive can complete an operation corresponding to the request. If the request is not independent of one or more of the severed requests, then the disk drive may be configured not to complete the operation corresponding to the request and may convey a NACK to the host interface that sent the request.

When the host interface receives a NACK from the disk drive, either indicating that its request has been dropped or that its request is not independent of another outstanding request, the host interface may reschedule the request and may convey a new packet corresponding to the request to the disk drive. The host interface may optimize the rescheduled request in a number of ways. For example, the host interface may reschedule the request at a less congested time. In addition, the host interface may merge the request with a subsequent request while ensuring consistency.

To perform a read request, a host interface may convey a move packet 201 corresponding to the read request to the disk drive through network 110. If none of the switching devices that receive move packet 201 detects a fault, corruption, or congestion, then move packet 201 may be routed to the disk drive. If a switching device that receives move packet 201 detects a fault, corruption, or congestion, then that switching device may generate an intention packet and may convey the intention packet to the disk drive. The disk drive may convey the intention packet back to the host interface though network 110.

If the move packet 201 makes it to the disk drive, then the disk drive may receive the read request packet and may read the data block or blocks specified by the request. The disk drive may then convey the data block or blocks in a write packet 220 to the host interface. If none of the switching devices that receive write packet 220 detects a fault, corruption, or congestion, then write packet 220 may be routed to the host interface to complete the read request. If a switching device that receives write packet 220 detects a fault, corruption, or congestion, then that switching device may generate an intention packet and may drop header 220*a* and payload 220*b* of write packet 220. The switching device may then convey the intention packet to the host interface though network 110. Again, the intention packet may be assured of routing successfully to the host interface by virtue of its relatively small size.

When the host interface receives an intention packet, either corresponding to its move packet or corresponding to the write packet from the disk drive, the host interface may reschedule the read request and may convey a new packet corresponding to the read request to the disk drive. The host interface may optimize the rescheduled request in a number of ways. For example, the host interface may reschedule the request after the disk drive has spun around or it may retarget the read request to a less congested mirror copy. In addition, the host interface may merge the request with a subsequent request while ensuring consistency.

Figure 3:
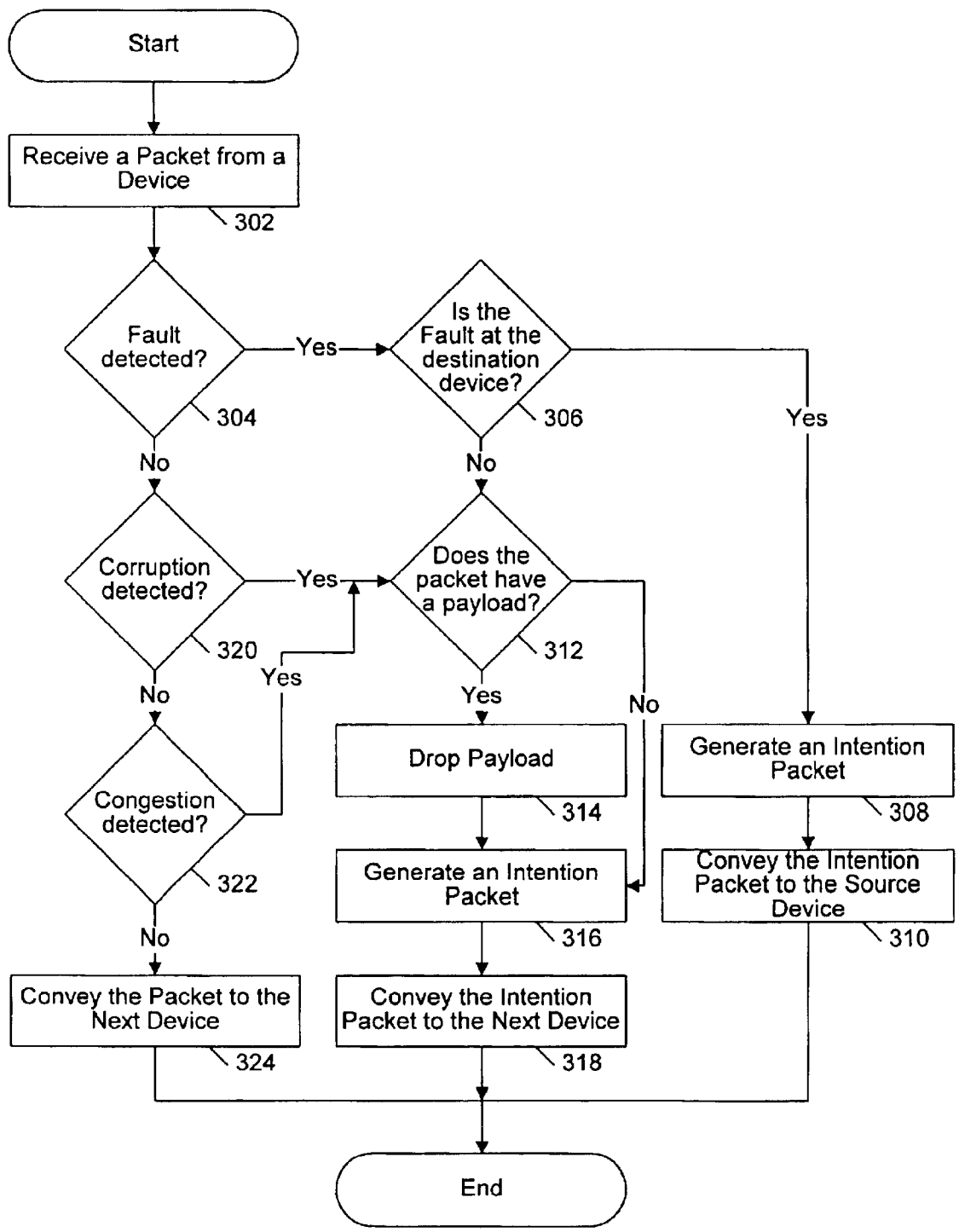
FIG. 3 is a flow chart illustrating one embodiment of a method for implementing an intention packet routing scheme in a switching device.

Turning now to FIG. 3, a flow chart illustrating a method for implementing a routing scheme in a switching device is shown. Variations on the method are possible and contemplated. In FIG. 3, a packet may be received from a first device as indicated in block 302. It can be noted that the first device may be the source device or a switching device. In block 304, a determination may be made as to whether a fault has been detected. If a fault has been detected, then a determination may be made as to whether the fault occurred at the destination device for the packet as indicated in block 306. If the fault occurred at the destination device, then an intention packet may be generated as indicated in block 308, and the intention packet may be conveyed to the source device as indicated in block 310.

If the fault did not occur at the destination device, then a determination may be made as to whether the packet has a payload as indicated in block 312. If the packet has a payload, then the payload may be dropped as indicated in block 314. It can be noted that only a portion of the payload may be dropped and that other portions of the packet may be dropped as well. Whether or not the packet has a payload, an intention packet may be generated as indicated in block 316, and the intention packet may be conveyed to the next device as indicated in block 318. It can be noted that the next device may be the destination device or a switching device and may be part of a route that differs from the route for the dropped packet.

If a fault has not been detected, a determination may be made as to whether corruption has been detected as indicated in block 320. If corruption has been detected, then a determination may be made as to whether the packet has a payload as indicated in block 312. If the packet has a payload, then the payload may be dropped as indicated in block 314. It can be noted that only a portion of the payload may be dropped and that other portions of the packet may be dropped as well. Whether or not the packet has a payload, an intention packet may be generated as indicated in block 316, and the intention packet may be conveyed to the next device as indicated in block 318. It can be noted that the next device may be the destination device or a switching device.

If corruption has not been detected, a determination may be made as to whether congestion has been detected as indicated in block 322. If congestion has been detected, then a determination may be made as to whether the packet has a payload as indicated in block 312. If the packet has a payload, then the payload may be dropped as indicated in block 314. It can be noted that only a portion of the payload may be dropped and that other portions of the packet may be dropped as well. Whether or not the packet has a payload, an intention packet may be generated as indicated in block 316, and the intention packet may be conveyed to the next device as indicated in block 318. It can be noted that the next device may be the destination device or a switching device.

If congestion has not been detected, then the packet may be conveyed to the next device as indicated in block 324. It can be noted that the next device may be the destination device or a switching device.

Note that FIG. 3 is merely exemplary of one embodiment. Other embodiments involve detection of only one or two of the adverse transmission conditions shown in FIG. 3. Alternatively, other combinations of adverse conditions may be checked and adverse conditions may be checked for in other orders.

Figure 4:
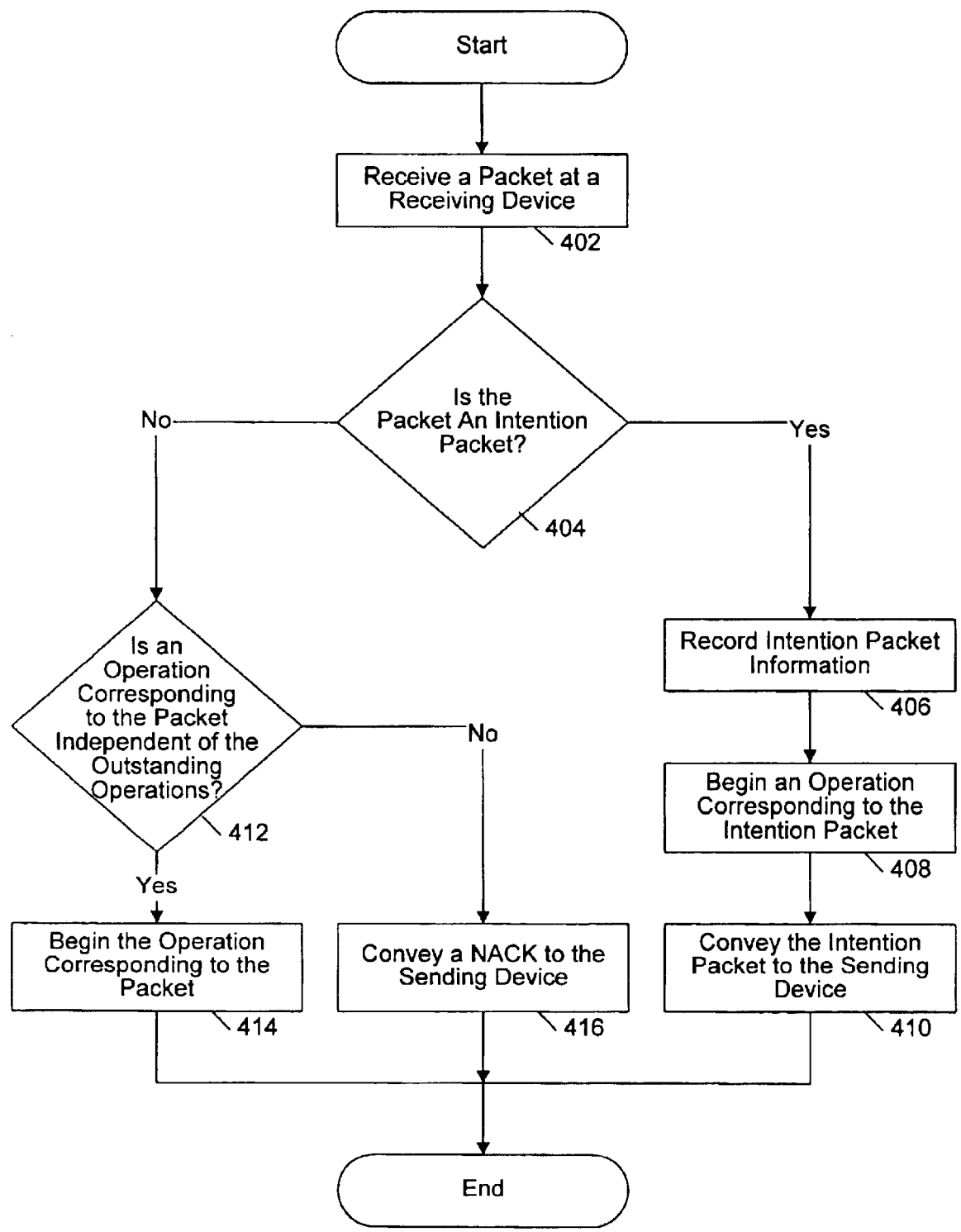
FIG. 4 is a flow chart illustrating one embodiment of a method for handling packets at a first exemplary device.

Turning now to FIG. 4, a flow chart illustrating a method for handling packets at a first exemplary device is shown. The first exemplary device may comprise a disk drive or another type of device. Variations on the method are possible and contemplated. In FIG. 4, a packet may be received at a receiving device as indicated in block 402. In block 404, a determination may be made as to whether the packet is an intention packet. In one embodiment, an intention packet may include a flag to indicate that it is an intention packet. If the packet is an intention packet, then intention packet information may be recorded as indicated in block 406. In addition, an operation corresponding to the intention packet may be begun as indicated in block 408, such as prefetching data blocks or flushing a write buffer. A NACK may be conveyed to the sending device as indicated in block 410. Note that the elements of the method indicated at 408 and 410 do not necessarily occur serially. Element 410 may be performed before 408, after 408 or concurrently with 408.

If the packet is not an intention packet, then a determination may be made as to whether an operation corresponding to the packet is independent of an outstanding operation as indicated in block 412. The outstanding operation may correspond to other intention packets that were received at the receiving device prior to the packet. If the operation corresponding to the packet is independent of the outstanding operations, or alternatively, if there are no outstanding operations at the receiving device, then the operation corresponding to the packet may be begun as indicated in block 414. If the operation corresponding to the packet is not independent of the outstanding operations, then a NACK may be conveyed to the sending device as indicated in block 416. In addition, the operation corresponding to the packet may not be performed.

Figure 5:
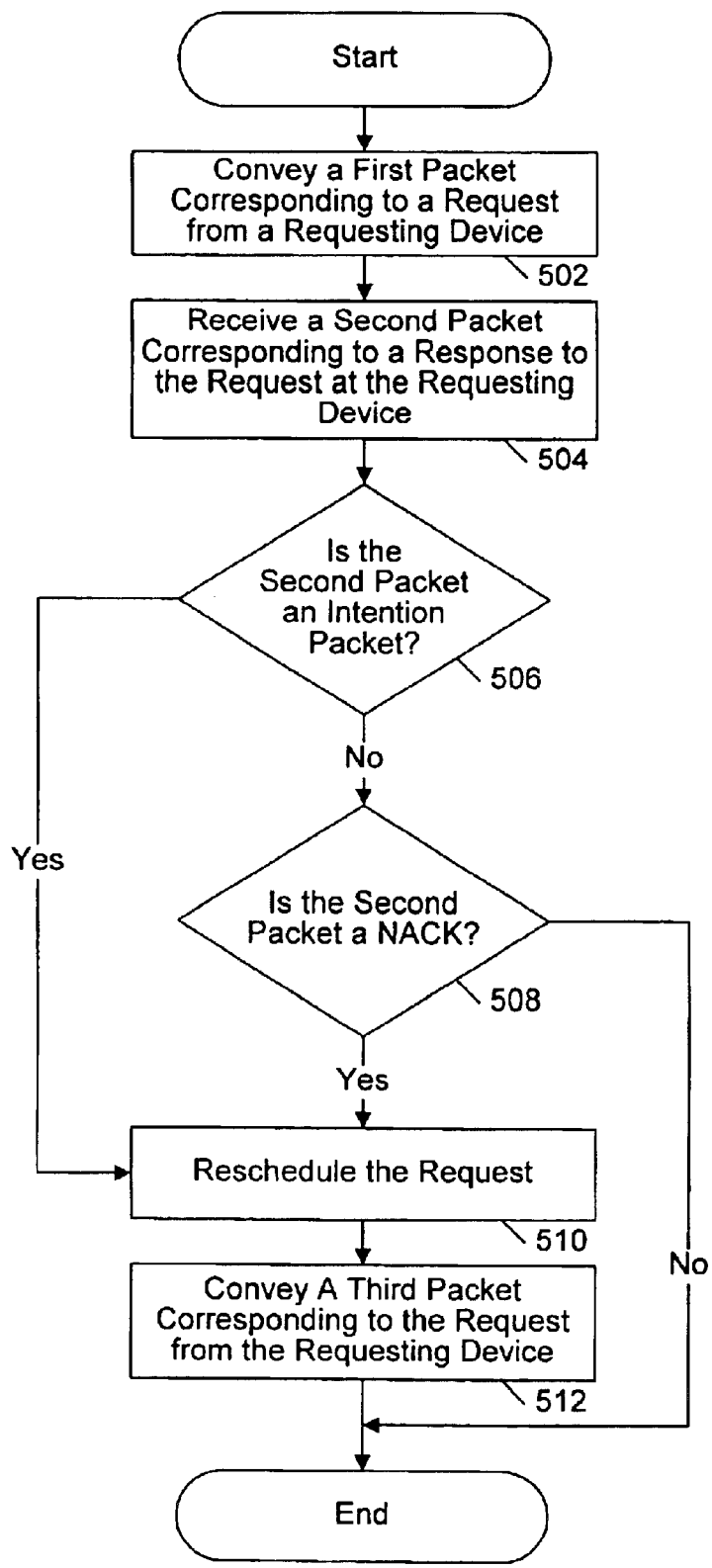
FIG. 5 is a flow chart illustrating one embodiment of a method for handling packets at a second exemplary device.

Turning now to FIG. 5, a flow chart illustrating a method for handling packets at a second exemplary device is shown. The second exemplary device may comprise a host interface or another type of device. Variations on the method are possible and contemplated. In FIG. 5, a first packet corresponding to a request from a requesting device may be conveyed as indicated in block 502. A second packet corresponding to a response to the request may be received at the requesting device as indicated in block 504. In block 506, a determination may be made as to whether the second packet is an intention packet. In addition, a determination may be made as to whether the second packet is a NACK as indicated in block 508. If the second packet is either an intention packet or a NACK, then the request may be rescheduled as indicated in block 510 and a third packet corresponding to the request may be conveyed from the requesting device as indicated in block 512.

It can be noted that the requesting device may receive an intention packet when the response to its request was dropped in route to the requesting device. The response, for example, may have included data corresponding to a read request from the requesting device. It can be further noted that the requesting device may receive a NACK when its request was not independent of an outstanding request at a receiving device.

Figure 6:
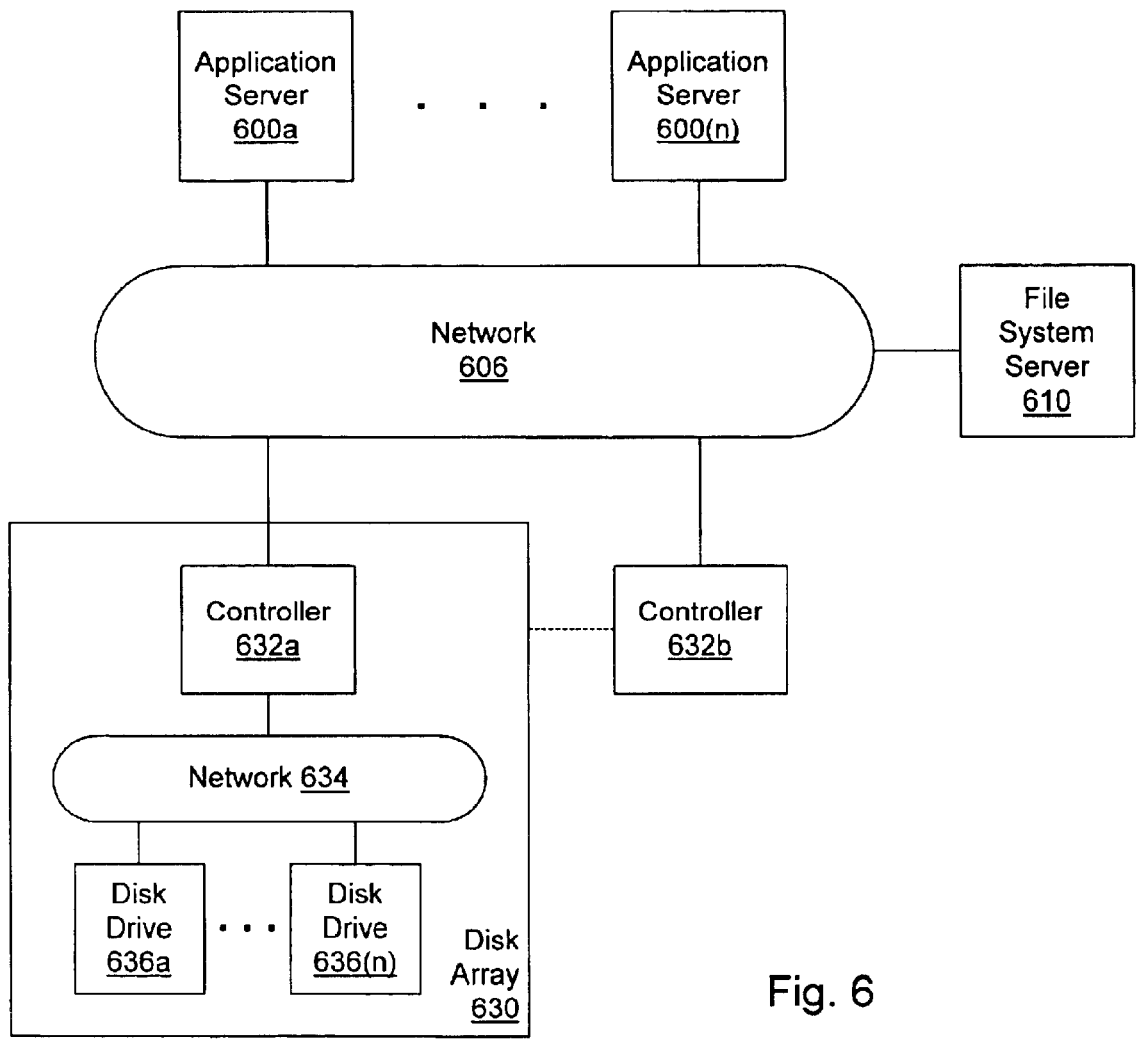
FIG. 6 is a block diagram of one embodiment of a computer system.

Turning now to FIG. 6, a block diagram of one embodiment of a system is shown. FIG. 6 depicts a plurality of application servers 600a through 600(n) (collectively, application servers 600), file system server 610, and disk array 630 coupled to a network 606. Disk array 630 includes controller 632a and a plurality of disk drives 636a through 636(n) (collectively, disk drives 636) coupled to network 634. In addition, controller 632b is coupled to network 606 and disk array 630.

The embodiment of FIG. 6 may be configured to implement the routing scheme discussed above with respect to FIGS. 1–5. In particular, controller 632a and controller 632b may each operate as a host interface to network 606 and may perform accesses to disk drives 636 on behalf of application servers 600 and file system server 610. Controller 632a and controller 632b may convey packets to and receive packets from the disk drives 636 through network 634. In response to congestion or other adverse conditions at a switching device in network 634, a packet may be dropped and an intention packet may be generated as discussed above. The intention packet mechanism may also be applied to network 606.

Figure 7:
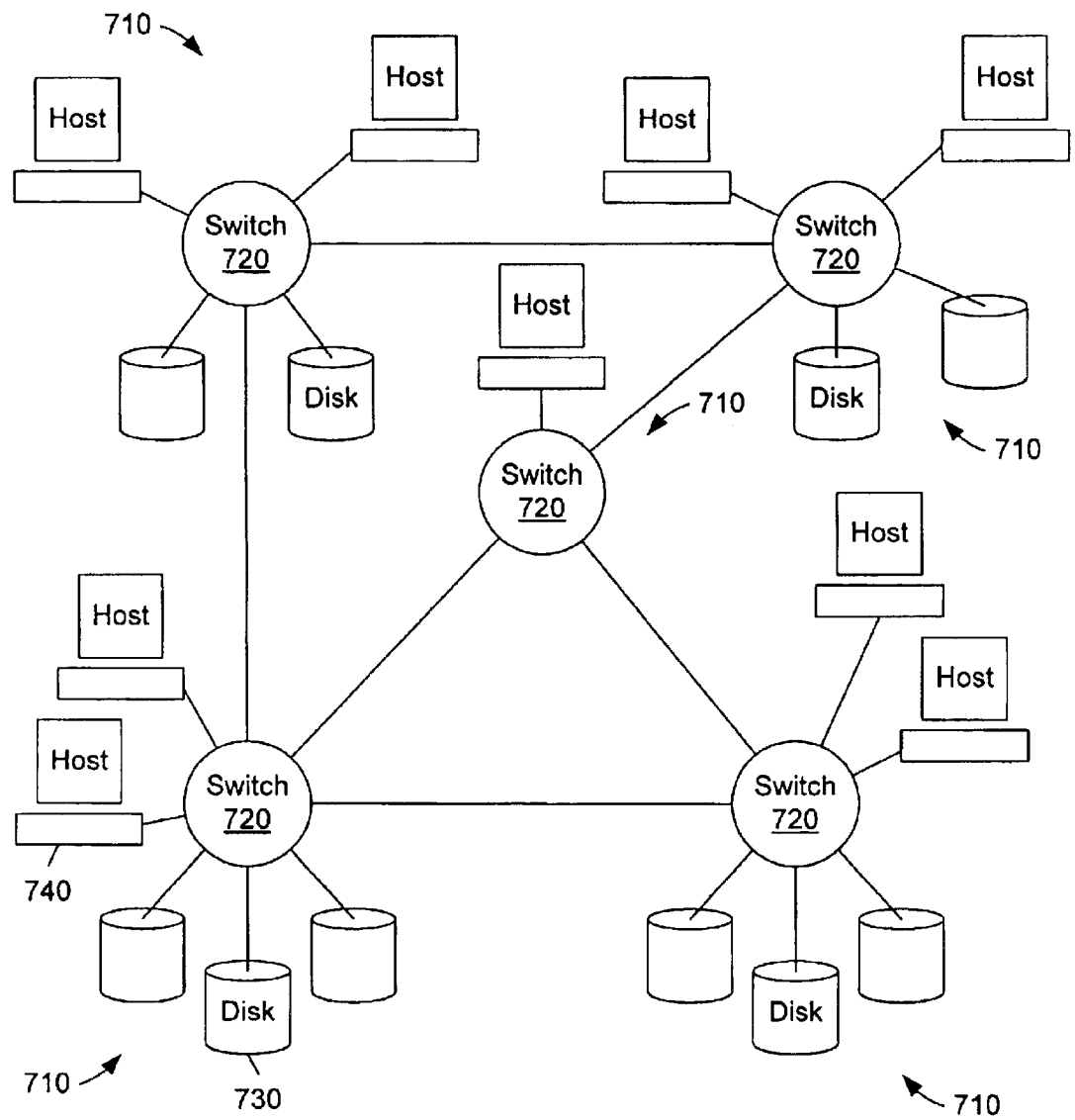
FIG. 7 is a block diagram of one embodiment of a plurality of nodes connected in a network.

Turning now to FIG. 7, a block diagram of one embodiment of a plurality of nodes connected in by a network is shown. Any number of nodes 710 may be included in the network. In the embodiment of FIG. 7, each node 710 may include a switching device 720. Nodes 710 may also include one or more devices such as a disk drive 730 or local host (e.g. computing) system 740. In other embodiments, each node 710 may include other types or numbers of devices and the nodes 710 may not be identical. The above-described routing mechanism employing intention packets may be applied to the system of FIG. 7. For example, a device at one node may initiate a request to a device at another node, such as from one host system to another or from a host system to a disk drive. A request may be routed from one node to another through several of the switching devices. If routing problems, such as faults, are encountered, the above-described intention packet routing mechanism may be employed.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 110 and/or a wireless link.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

I claim:

1. An apparatus, comprising:
   a first device;
   a second device;
   a network including a switching device coupled to said first device and said second device,
   wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault, wherein said second packet includes route information for said first packet.

2. The apparatus of claim 1, wherein said second packet includes information from a portion of said first packet.

3. The apparatus of claim 1, wherein said switching device is configured to drop a payload portion of said first packet in response to detecting said fault in said network.

4. The apparatus of claim 1, wherein said switching device is configured to convey said first packet along a first route through said network in response to not detecting said fault in said network, and wherein said switching device is configured to convey said second packet along a second route through said network in response to detecting said fault in said network.

5. The apparatus of claim 4, wherein said switching device is configured to include route information corresponding to said second route in said second packet.

6. The apparatus of claim 1, wherein said switching device is configured to generate a third packet and convey said third packet to said first device in response to detecting a fault at said second device.

7. The apparatus of claim 6, wherein said third packet includes a destination failure indication.

8. The apparatus of claim 1, wherein said second device is configured to convey a third packet to said first device in response to receiving said second packet.

9. The apparatus of claim 8, wherein said first packet corresponds to a request, and wherein said first device is configured to convey a fourth packet corresponding to said request in response to receiving said third packet.

10. The apparatus of claim 9, wherein said third packet indicates an alternative route through said network for said fourth packet.

11. The apparatus of claim 9, wherein said second device is configured to complete an operation corresponding to said request in response to receiving said fourth packet.

12. The apparatus of claim 8, wherein said second device is configured to perform a first operation corresponding to a request indicated by said second packet, and wherein said first packet corresponds to said request.

13. The apparatus of claim 12, wherein said second device is configured to receive a fourth packet subsequent to receiving said second packet, and wherein said second device is configured to perform a second operation corresponding to said fourth packet in response to determining that said second operation is independent of said request.

14. The apparatus of claim 13, wherein said second device is configured to convey a fifth packet corresponding to said fourth packet in response to determining that said second operation is not independent of said request, and wherein said fifth packet comprises a negative acknowledgement.

15. The apparatus of claim 8, wherein said first packet corresponds to a response to a request, wherein said second device is configured to reschedule said request in response to receiving said second packet, and wherein said third packet comprises said request.

16. The apparatus of claim 15, wherein said second packet indicates an alternative route through said network for said third packet.

17. The apparatus of claim 1, wherein said switching device is further configured to drop at least part of said first packet, generate a second packet, and convey said second packet to said second device in response to detecting congestion corresponding to said first packet, wherein said second packet includes information about said first packet.

18. The apparatus of claim 1, wherein said switching device is further configured to drop at least part of said first packet, generate a second packet, and convey said second packet to said second device in response to detecting corruption corresponding to said first packet, wherein said second packet includes information about said first packet.

19. A method, comprising:
  receiving a first packet from a first device;
  detecting a fault in a network coupled to said first device and a second device; and
  in response to detecting said fault:
    dropping at least part of said first packet;
    generating a second packet, wherein said second packet includes information about said first packet or about the fault, wherein said second packet includes route information for said first packet; and
    conveying said second packet to a second device.

20. The method of claim 19, wherein said generating comprises converting a portion of said first packet into said second packet.

21. The method of claim 19, further comprising dropping a payload portion of said first packet in response to said detecting a fault.

22. The method of claim 19, further comprising conveying a third packet from said second device to said first device in response to receiving said second packet at said second device.

23. The method of claim 22, further comprising:
  rescheduling a request in response to receiving said third packet at said first device, wherein said first packet corresponds to said request; and
  conveying a fourth packet corresponding to said request from said first device to said second device.

24. The method of claim 23, wherein said conveying a fourth packet further comprises conveying said fourth packet on a route through said network indicated by said third packet.

25. The method of claim 21, further comprising performing a first operation corresponding to a request indicated by said second packet at said second device, wherein said first packet corresponds to said request.

26. The method of claim 25, further comprising:
  receiving a fourth packet from a third device at said second device subsequent to receiving said second packet; and
  performing a second operation corresponding to said fourth packet in response to determining that said second operation is independent of said request.

27. The method of claim 26, further comprising conveying a fifth packet corresponding to said fourth packet from said second device to said third device in response to determining that said second operation is not independent of said request, wherein said fifth packet comprises a negative acknowledgement.

28. The method of claim 22, further comprising rescheduling a request in response to receiving said second packet, wherein said first packet corresponds to a response to said request, and wherein said third packet corresponds to said request.

29. The method of claim 28, further comprising routing said third packet through said network according to said second packet.

30. The method of claim 19, further comprising:
  receiving a third packet from a third device;
  detecting congestion in said network coupled to said third device and a fourth device; and
  in response to detecting said congestion:
    dropping at least part of said third packet;
    generating a fourth packet, wherein said fourth packet includes information about said third packet; and
    conveying said fourth packet to said fourth device.

31. The method of claim 19, further comprising:
  receiving a third packet from a third device;
  detecting corruption in said network coupled to said third device and a fourth device; and
  in response to detecting said corruption:
    dropping at least part of said third packet;
    generating a fourth packet, wherein said fourth packet includes information about said third packet; and
    conveying said fourth packet to said fourth device.

32. An apparatus, comprising:
  a first port;
  a second port; and
  a switching device coupled to said first port and said second port, wherein said switching device is configured to receive a first packet, wherein said switching device is configured to detect a fault in attempting to route said first packet using said second port, and wherein said switching device is configured to convey a second packet on said second port in place of said first packet in response to detecting said fault, wherein said second packet includes information about said first packet or about the fault, wherein said second packet includes route information for said first packet.

33. The device of claim 32, wherein said second packet includes at least a portion of said first packet.

34. The device of claim 32, wherein said switching device is configured to drop at least a portion of said first packet.

35. An apparatus, comprising:
  a first device;
  a second device;
  a network including a switching device coupled to said first device and said second device,
  wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault; and
  wherein said switching device is configured to drop a payload portion of said first packet in response to detecting said fault in said network.

36. An apparatus, comprising:
a first device;
a second device;
a network including a switching device coupled to said first device and said second device,
wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault; and
wherein said switching device is configured to convey said first packet along a first route through said network in response to not detecting said fault in said network, and wherein said switching device is configured to convey said second packet along a second route through said network in response to detecting said fault in said network.

37. The apparatus of claim 36, wherein said switching device is configured to include route information corresponding to said second route in said second packet.

38. An apparatus, comprising:
a first device;
a second device;
a network including a switching device coupled to said first device and said second device,
wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault; and
wherein said switching device is configured to generate a third packet and convey said third packet to said first device in response to detecting a fault at said second device.

39. The apparatus of claim 38, wherein said third packet includes a destination failure indication.

40. A method, comprising:
receiving a first packet from a first device;
detecting a fault in a network coupled to said first device and a second device; and
in response to detecting said fault:
 dropping at least part of said first packet;
 wherein said dropping at least part of said first packet comprises dropping a payload portion of said first packet;
 generating a second packet, wherein said second packet includes information about said first packet or the fault; and
 conveying said second packet to a second device.

41. A method, comprising:
receiving a first packet from a first device;
detecting a fault in a network coupled to said first device and a second device; and
in response to detecting said fault:
 dropping at least part of said first packet;
 generating a second packet, wherein said second packet includes information about said first packet or the fault;
 conveying said second packet to a second device;
 conveying a third packet from said second device to said first device in response to receiving said second packet at said second device;
 rescheduling a request in response to receiving said third packet at said first device, wherein said first packet corresponds to said request; and
 conveying a fourth packet corresponding to said request from said first device to said second device.

42. The method of claim 41, wherein said conveying a fourth packet further comprises conveying said fourth packet on a route through said network indicated by said third packet.

43. The method of claim 40, further comprising performing a first operation corresponding to a request indicated by said second packet at said second device, wherein said first packet corresponds to said request.

44. An apparatus, comprising:
a first device;
a second device;
a network including a switching device coupled to said first device and said second device,
wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault;
wherein said second device is configured to convey a third packet to said first device in response to receiving said second packet;
wherein said first packet corresponds to a request, and wherein said first device is configured to convey a fourth packet corresponding to said request in response to receiving said third packet.

45. An apparatus, comprising:
a first device;
a second device;
a network including a switching device coupled to said first device and said second device,
wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault;
wherein said second device is configured to convey a third packet to said first device in response to receiving said second packet;
wherein said second device is configured to perform a first operation corresponding to a request indicated by said second packet, and wherein said first packet corresponds to said request.

46. An apparatus, comprising:
a first device;
a second device;
a network including a switching device coupled to said first device and said second device,
wherein said network is configured to convey a first packet from said first device to said second device, wherein said switching device is configured to receive said first packet, and wherein said switching device is configured to drop at least part of said first packet, generate a second packet, and convey said second packet to said second device in response to detecting a fault in said network, wherein said second packet includes information about said first packet or about the fault;
wherein said second device is configured to convey a third packet to said first device in response to receiving said second packet;
wherein said first packet corresponds to a response to a request, wherein said second device is configured to reschedule said request in response to receiving said second packet, and wherein said third packet comprises said request.

47. A method, comprising:

receiving a first-packet from a first device;

detecting a fault in a network coupled to said first device and a second device; and in response to detecting said fault:

dropping at least part of said first packet;

generating a second packet, wherein said second packet includes information about said first packet or the fault;

conveying said second packet to a second device;

conveying a third packet from said second device to said first device in response to receiving said second packet at said second device; and rescheduling a request in response to receiving said second packet, wherein said first packet corresponds to a response to said request, and wherein said third packet corresponds to said request.

* * * * *